(12) United States Patent
Boyer et al.

(10) Patent No.: US 10,705,958 B2
(45) Date of Patent: Jul. 7, 2020

(54) COHERENCY DIRECTORY ENTRY ALLOCATION BASED ON EVICTION COSTS

(71) Applicant: ADVANCED MICRO DEVICES, INC., Santa Clara, CA (US)

(72) Inventors: Michael W. Boyer, Bellevue, WA (US); Gabriel H. Loh, Bellevue, WA (US); Yasuko Eckert, Bellevue, WA (US); William L. Walker, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 132 days.

(21) Appl. No.: 16/108,696

(22) Filed: Aug. 22, 2018

(65) Prior Publication Data

US 2020/0065246 A1 Feb. 27, 2020

(51) Int. Cl.
*G06F 12/12* (2016.01)
*G06F 12/0817* (2016.01)
*G06F 12/0842* (2016.01)
*G06F 11/30* (2006.01)

(52) U.S. Cl.
CPC ...... *G06F 12/0817* (2013.01); *G06F 11/3037* (2013.01); *G06F 12/0842* (2013.01); *G06F 2201/88* (2013.01); *G06F 2201/885* (2013.01); *G06F 2212/1021* (2013.01); *G06F 2212/6046* (2013.01)

(58) Field of Classification Search
CPC ............. G06F 12/0817; G06F 12/0842; G06F 11/3037
USPC ........................................................ 711/141
See application file for complete search history.

(56) References Cited

U.S. PATENT DOCUMENTS

| | | | |
|---|---|---|---|
| 2002/0087807 A1* | 7/2002 | Gharachorloo | G06F 12/0826 711/141 |
| 2003/0174655 A1* | 9/2003 | Luk | H04L 43/12 370/252 |
| 2005/0050240 A1* | 3/2005 | Wilkins | G06F 3/0613 710/15 |
| 2011/0029736 A1* | 2/2011 | Sato | G06F 12/0837 711/130 |

* cited by examiner

*Primary Examiner* — Jae U Yu

(57) ABSTRACT

A processor partitions a coherency directory into different regions for different processor cores and manages the number of entries allocated to each region based at least in part on monitored recall costs indicating expected resource costs for reallocating entries. Examples of monitored recall costs include a number of cache evictions associated with entry reallocation, the hit rate of each region of the coherency directory, and the like, or a combination thereof. By managing the entries allocated to each region based on the monitored recall costs, the processor ensures that processor cores associated with denser memory access patterns (that is, memory access patterns that more frequently access cache lines associated with the same memory pages) are assigned more entries of the coherency directory.

22 Claims, 6 Drawing Sheets

COHERENCY DIRECTORY ENTRY ALLOCATION BASED ON EVICTION COSTS

BACKGROUND

To enhance processing speed and efficiency, modern processing systems typically include multiple processing units that concurrently execute instructions. The different processing units are supported by a memory hierarchy that stores data for the different processing units, whereby the memory hierarchy can include one or more caches dedicated to corresponding processing units, one or more caches shared between the processing units, and a system memory (also referred to as "main memory") that stores data available to all the processing units, or any combination thereof. The processing system implements a specified memory management scheme to govern how data is shared between the different processing units and the different caches of the cache hierarchy and to ensure data coherency throughout the memory hierarchy by enforcing a specified coherency protocol.

To support the coherency protocol, the processing system includes one or more coherency managers. A coherency manager maintains a coherency directory having entries that store coherency information for all cache lines that are cached in the cache hierarchy. Conventionally, the coherency directory includes an entry for each cache line of the entire memory hierarchy. However, maintaining coherency information for each cache line requires the coherency directory to be provisioned with a large memory structure to store the coherency information. Accordingly, some processing systems employ a coherency manager that includes a coherency directory having a coarser granularity, such that each entry of the coherency directory corresponds to multiple contiguous cache lines (referred to as "pages") of the memory hierarchy. The coherency manager assigns individual entries of the coherency directory to corresponding pages as cache lines corresponding to the pages are loaded into the caches. However, some memory access patterns can cause the coherency directory to run out of entries before the caches are fully utilized, increasing memory management overhead and reducing processing efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for partitioning a coherency directory into different regions for different processor cores and managing the number of entries allocated to each region based at least in part on monitored recall costs indicating expected resource costs for reallocating entries. Examples of monitored recall costs include a number of cache evictions associated with entry reallocation, the hit rate of each region of the coherency directory, and the like, or a combination thereof. By managing the entries allocated to each region based on the monitored recall costs, the processing system ensures that processor cores associated with denser memory access patterns (that is, memory access patterns that more frequently access cache lines associated with the same memory pages) are assigned more entries of the coherency directory. This reduces the number of cache evictions associated with management of the coherency directory entries, thereby improving overall processing efficiency.

To illustrate via an example, in some embodiments each processor core of the processing system is assigned to a corresponding region of the coherency directory, with each region initially allocated the same number of entries. In response to identifying that a processor core needs more entries (e.g. because the processor core has used all of the available entries of its corresponding coherency directory region), the coherency manager reallocates an entry from a selected other region of the coherency directory to the region of the processor core that needs more entries. The coherency manager selects the region that is expected to require the least resources for reassignment, as indicated by the recall costs monitored for each region. The coherency manager thereby reduces the resource costs associated with reallocating entries among regions of the coherency directory.

Figure 1:
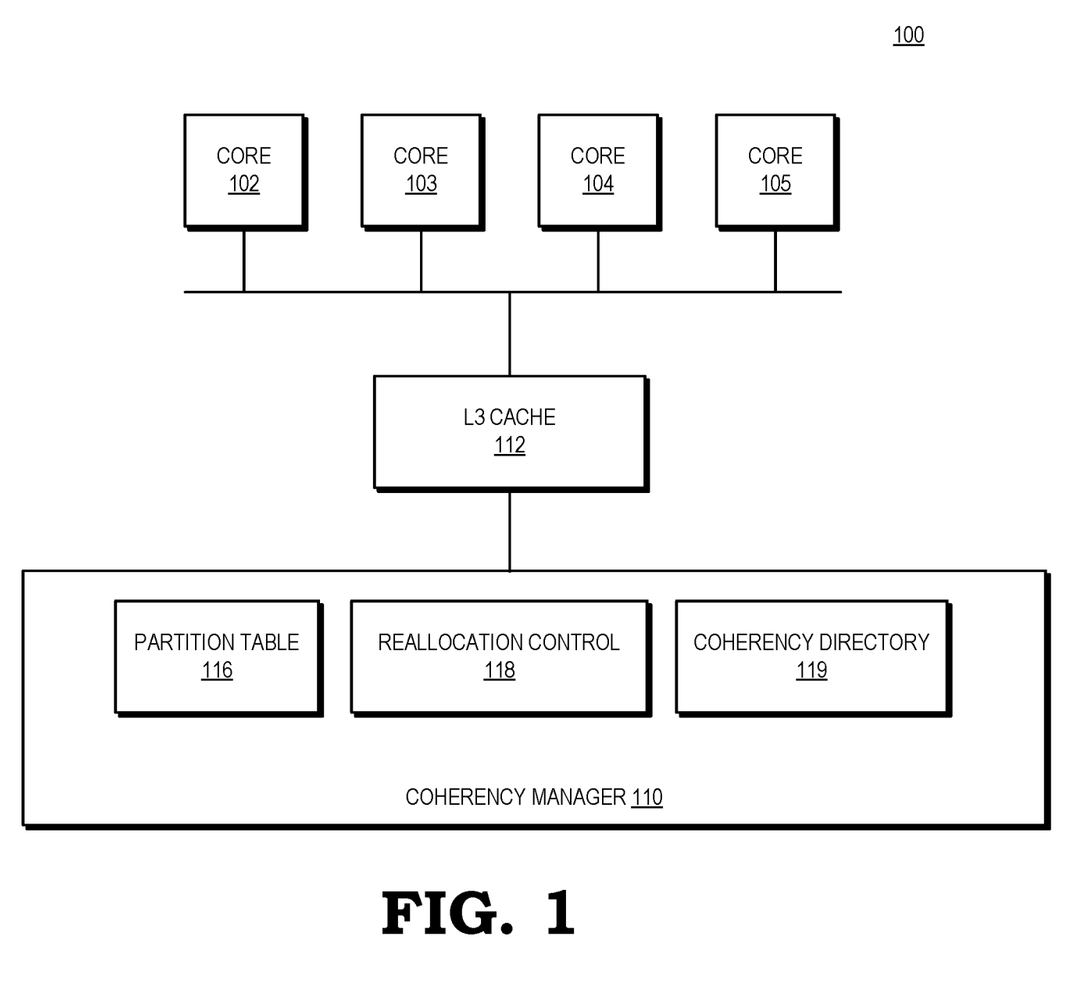
FIG. 1 is a block diagram of a processing system that manages allocation of entries of a coherency directory among different processor cores based on recall costs for a corresponding cache in accordance with some embodiments.

FIG. 1 illustrates a block diagram of a processor 100 that selectively transfers data from one of a cache and system memory based on estimated access latencies in accordance with some embodiments. The processor 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processor 100 is employed in one of a number of types of electronic device, such as a desktop computer, laptop computer, server, game console, tablet, smartphone, and the like.

To support execution of the sets of instructions, the processor 100 includes a plurality of processor cores, illustrated as processor cores 102-105. In some embodiments, each of the processor cores 102-105 includes one or more instruction pipelines to fetch instructions, decode the instructions into corresponding operations, dispatch the operations to one or more execution units, execute the operations, and retire the operations. In addition, in some embodiments different processor cores are configured to execute particular types of instructions. For example, in some embodiments one or more of the processor cores are configured as central processing units (CPUs) to execute general instructions, while one or more other processor cores are configured as graphics processing units (GPUs) to execute graphics instructions associated with, for example, the construction and presentation of images.

To support the manipulation of data at the processor cores, the processor 100 includes a memory hierarchy having a plurality of caches, including a level 3 (L3) cache 112 and a system memory (not shown). The caches are generally configured to store data that is expected to be accessed in the relatively near future by at least one of the processor cores. In some embodiments, the memory hierarchy is organized such that each processor core 102-105 includes at least one local cache (not shown) from which it accesses data. The local caches form a local cache hierarchy for the corresponding processor core. In contrast, the L3 cache 112 is a cache that is shared among the processor cores 102-105. For purposes of description, it is assumed that the L3 cache 112 is an inclusive cache, but it will be appreciated that the techniques described herein are applicable to other configurations, including configurations wherein the L3 cache is non-inclusive.

The memory hierarchy of the processor 100 is associated with a memory address space that indicates the locations where data is stored at the memory hierarchy. Each processor core accesses data at the memory hierarchy of the processor 100 by generating operations, referred to as memory access requests, wherein each memory access request includes a memory address of the data targeted by the memory access request. Examples of memory operations include write requests to modify data stored at the memory hierarchy and read requests to retrieve data from the memory hierarchy.

In response to a memory access request, the memory hierarchy satisfies the memory access request by traversing the local cache hierarchy as follows. The processor core provides the memory access request to the lowest level cache of its corresponding local cache hierarchy referred to as the L1 cache for purposes of description. If the L1 cache includes an entry assigned to the memory address targeted by the memory access request, the cache indicates a cache hit and satisfies the memory access request. For read requests, the memory access request is satisfied by providing data stored at the entry to the processor core. For write requests the request is satisfied by checking the coherency state for the entry targeted by the request, as described further below, and by storing data at the entry once the appropriate coherency permission has been received.

If the L1 cache does not include an entry assigned to the memory address, the cache indicates a cache miss and provides the memory access request to the next higher-level cache of the local cache hierarchy, referred to for purposes of description as the L2 cache. If the L2 cache includes an entry assigned to the targeted memory address, the L2 cache provides the data stored at the entry to the L1 cache, which allocates an entry for the corresponding memory address and stores the data at the assigned entry. The L1 cache then satisfies the memory access request. In response to a cache miss at the L2 cache, the memory access request is provided to the next-higher level cache of the local cache hierarchy. The traversal continues in a similar fashion until the memory access request reaches the L3 cache 112. In response to a cache miss at the L3 cache 112, the data targeted by the memory access request is obtained from the system memory or another cache.

To maintain data coherency between the different processor cores and throughout the memory hierarchy, the processor 100 includes a coherency manager 110 to enforce a specified data coherency protocol, such as a Modified-Owned-Exclusive-Shared-Invalid (MOESI) protocol. It will be appreciated that the coherence manager 110 is described herein as a single module, but in other embodiments the operations of the coherence manager 110 as described herein are distributed among multiple coherency managers.

The coherency manager 110 identifies identify and manages the coherency states of data stored in the cache hierarchy, and enforces the specified data coherency protocol for the processor 100. For example, in response to a memory access request that missed in the L3 cache 112, the L3 cache 112 provides a coherency probe to the coherency manager 110. In response to the coherency probe, the coherency manager 110 performs a set of operations as specified by the data coherency protocol, wherein the set of operations includes one or more of: 1) identifying a current coherency status for the memory address targeted by the memory access request; 2) sending coherency invalidation messages to one or more caches of the processor 100 to ensure an exclusive access to the memory address for write requests; 3) transferring data between caches of the different processor cores; and 4) transferring data between the system memory and the caches, including the L3 cache 112.

To manage data coherency, the coherency manager 110 includes a coherency directory 119 having a plurality of entries, each entry storing coherency information for data stored in the cache hierarchy. In some embodiments, the coherency directory 119 stores coherency information at a coarser granularity than the entries of the caches. For example, in some embodiments, each entry of the L3 cache 112 is dynamically assigned to a cache line of the memory hierarchy. The coherency manager 110 dynamically assigns entries of the coherency directory 119 to different pages, wherein a page corresponds to an aligned, contiguous set of multiple cache lines of the memory hierarchy. Thus, if the L3 cache 112 stores multiple cache lines associated with the same page, coherency data for each of the multiple cache lines are stored at a single entry of the coherency directory 119 corresponding to the page. It will be appreciated that in some embodiments the pages associated with the coherency directory 119 are different than the memory pages managed by one or more operating systems executing at the processor 100.

In some scenarios, the processor cores 102-105 concurrently execute different sets of instructions on behalf of different entities, such as different virtual machines. To ensure that each set of instructions is able to efficiently use the L3 cache 112, the coherency manager 110 partitions the coherency directory 119 into a plurality of regions, with each region including a plurality of different entries of the coherency directory 119, and with each region assigned to a different one of the processor cores 102-105. The coherency manager 110 employs a partition table 116 to store information indicating the entries assigned to each region of the coherency directory 119.

In some embodiments, the coherency manager 110 manages the regions of the coherency directory 119 as follows: initially (e.g. in response to a reset of the processor 100) the coherency manager 110 assigns each region an equal number of entries of the coherency directory 119. In response to a memory access request from a processor core causing a cache line (referred to for purposes of description as the "loaded cache line") to be loaded to an entry of the L3 cache 112, the coherency manager 110 determines if the coherency directory 119 has an entry assigned to the page of the loaded cache line. If so, the coherency manager 110 assigns the identified entry to the region of the coherency directory 119 allocated to the processor core (if it is not already assigned to that region) and stores coherency information for the loaded cache line at the identified entry.

If the coherency directory 119 does not include an entry assigned to the page of the loaded cache line, the coherency manager 110 determines if the region of the coherency directory 119 allocated to the processor core has an available entry—that is, an entry that is not currently assigned to a page associated with valid cache lines stored in the cache hierarchy. If so, the coherency manager 110 assigns the available entry to the page of the loaded cache line and stores coherency data for the loaded cache line at the assigned entry.

If the region of the coherency directory 119 allocated to the processor core does not have an available entry, the coherency manager 110 selects an entry of another region of the coherency directory 119, as described further below. The coherency manager 110 reallocates the selected entry to the region allocated to the processor core that caused the load of the cache line, assigns the selected entry to the page of the loaded cache line, and stores coherency data for the loaded cache line at the assigned entry. In some embodiments, rather than or in addition to reallocating entries of the coherency directory 119 from one region to another in response to loading of cache lines to the L3 cache 112, the coherency manager 110 periodically rebalances the number of entries allocated to each region, as described further herein.

In other embodiments, the coherency manager 110 maintains a pool of entries that are able to be allocated to any region and allocates an entry to a region in response to determining that the corresponding processor core has requested a cache line for which the corresponding page does not have an entry at the coherency directory 119. The coherency manager 110 deallocates an entry from a region in response to determining that all cache lines cached in the cache hierarchy included in the page associated with the entry have been invalidated. The coherency manager 110 reallocates entries from one region to another when the pool of entries is empty, and a region needs an additional entry for the page of a loaded cache line.

It will be appreciated that in some situations reallocating an entry of the coherency directory 119 triggers actions at the processor 100 that consume resources. These actions are referred to herein as "recall costs." An example of recall costs is eviction of cache lines from the L3 cache 112 in response to an entry of the coherency directory 119 being reallocated to a different region. To illustrate, in order to maintain data coherency, when an entry of the coherency directory 119 is reassigned from a first page to a different, second page, the coherency manager 110 instructs all caches to evict all cache lines associated with the first page. Thus, when an entry of one region is reassigned to another region, the coherency manager 110 instructs all caches to evict all cache lines associated with the page corresponding to the entry being reassigned. The resulting evictions of cache lines consume processor resources, and therefore are recall costs.

To enhance processing efficiency, the coherency manager 110 includes a reallocation control module 118 to monitor the expected recall costs for each region of the coherency directory 119. In some embodiments, when selecting an entry of the coherency directory 119 for reassignment to a different region, the coherency manager selects an entry from the region having the lowest recall costs as indicated by the reallocation control module 118. The coherency manager 110 thereby minimizes the expected amount of processor resources consumed by reallocating the entry, improving processing efficiency.

The reallocation control module 118 monitors the expected recall costs in any of a number of different ways. In some embodiments, the reallocation control module 118 monitors a "miss rate" for each processor core 102-105, corresponding to the rate at which coherency probes generated by the processor core require the coherency manager 110 to assign a new page to an entry of the coherency directory 119 (i.e. the rate at which coherency probes generated by the processor core correspond to cache lines for which the corresponding page does not have an entry at the coherency directory 119). In different embodiments the reallocation control module 118 identifies the miss rate based on a specified amount of time (e.g., misses per N clock cycles), based on a specified amount of directory accesses (e.g. misses per N accesses to the coherency directory 119, where N is the total number of accesses, or is the total number of accesses for a given processor core). A high miss rate indicates inefficient use of the coherency directory 119 by the corresponding processor core. Accordingly, in some embodiments, responsive to the miss rate for a processor core exceeding a specified threshold the coherency manager 110 reallocates at least one entry of the region of the coherency directory 119 corresponding to the processor core to a different region. In other embodiments, responsive to the miss rate for a processor core falling below a specified threshold (indicating efficient use of the directory by the processor core), the coherency manager 110 reallocates at least one entry to the region of the coherency directory 119 corresponding to the processor core from a different region. In some embodiments, to prevent a processor core from being starved of resources at the coherence directory 119, the coherency manager 110 ensures that the number of entries of the coherency directory 119 assigned to each region does not fall below a specified threshold.

In some embodiments, the reallocation control module 118 maintains a count (referred for purposes of description as a reallocation cost) for each region of the coherency directory 119 indicating the number of cache lines in the cache hierarchy that are invalidated or written back to system memory in response to eviction of an entry of the corresponding region. Thus, for example, if an entry of a given region of the coherency directory 119 is evicted, and in response two cache lines of the L3 cache 112 are invalidated or written back to main memory, the reallocation control module 118 increments the count for the given region by two. In some embodiments, when selecting an entry of the coherency directory 119 for reallocation, the coherency manager 110 selects an entry of the region having the lowest reallocation cost, thereby increasing the likelihood that reallocation of the selected entry will require relatively few invalidations or writebacks at the caches. In some embodiments, the coherency manager 110 periodically resets the reallocation cost for each region or reduces the reallocation cost by a specified amount or factor, thereby ensuring that the reallocation costs reflect relatively recent activity for each processor core.

In some embodiments, the reallocation control module 118 maintains a count (referred for purposes of description as a core impact cost) for each region of the coherency directory 119 indicating the number of cache lines in the cache hierarchy that are invalidated or written back to system memory in response to reallocation of an entry to the corresponding region. Thus, for example, if an entry of the coherency directory 119 is reallocated to a given region, and in response three cache lines of the L3 cache 112 are invalidated or written back to main memory (because of eviction of the entry to be reallocated), the reallocation control module 118 increments the count for the given region by three. In some embodiments, in response to the core impact cost exceeding a threshold, the coherency manager 110 suppresses reallocation of entries to the corresponding region of the coherency directory 119, thereby reducing a high number of invalidations or writebacks from the caches. In some embodiments, the coherency manager 110 periodically resets the reallocation cost for each region or reduces the reallocation cost by a specified amount or factor, thereby ensuring that the reallocation costs reflect relatively recent activity for each processor core.

In some embodiments, the reallocation control module 118 maintains a density value for each entry of the coherency directory 119, wherein the density value for an entry indicates the number of unique cache lines stored in the cache hierarchy that are included in the page corresponding to the entry. In some embodiments, when selecting an entry to be reallocated from one region to another, the coherency manager 110 selects the entry having the lowest density value, thereby minimizing the expected impact of evicting the selected entry.

It will be appreciated that the coherency manager 110, in different embodiments, employs any of the above indicators of recall costs individually or in combination. For example, in some embodiments the coherency manager 110 selects an entry of the coherency directory 119 from one region to another based on a combination of miss rate, reallocation cost, core impact cost, and density value. Further, in some embodiments the coherency manager 110 weights each of the one or more recall costs employed in the selection according to a specified set of weights, wherein at least one set of weights is different from another.

Figure 2:
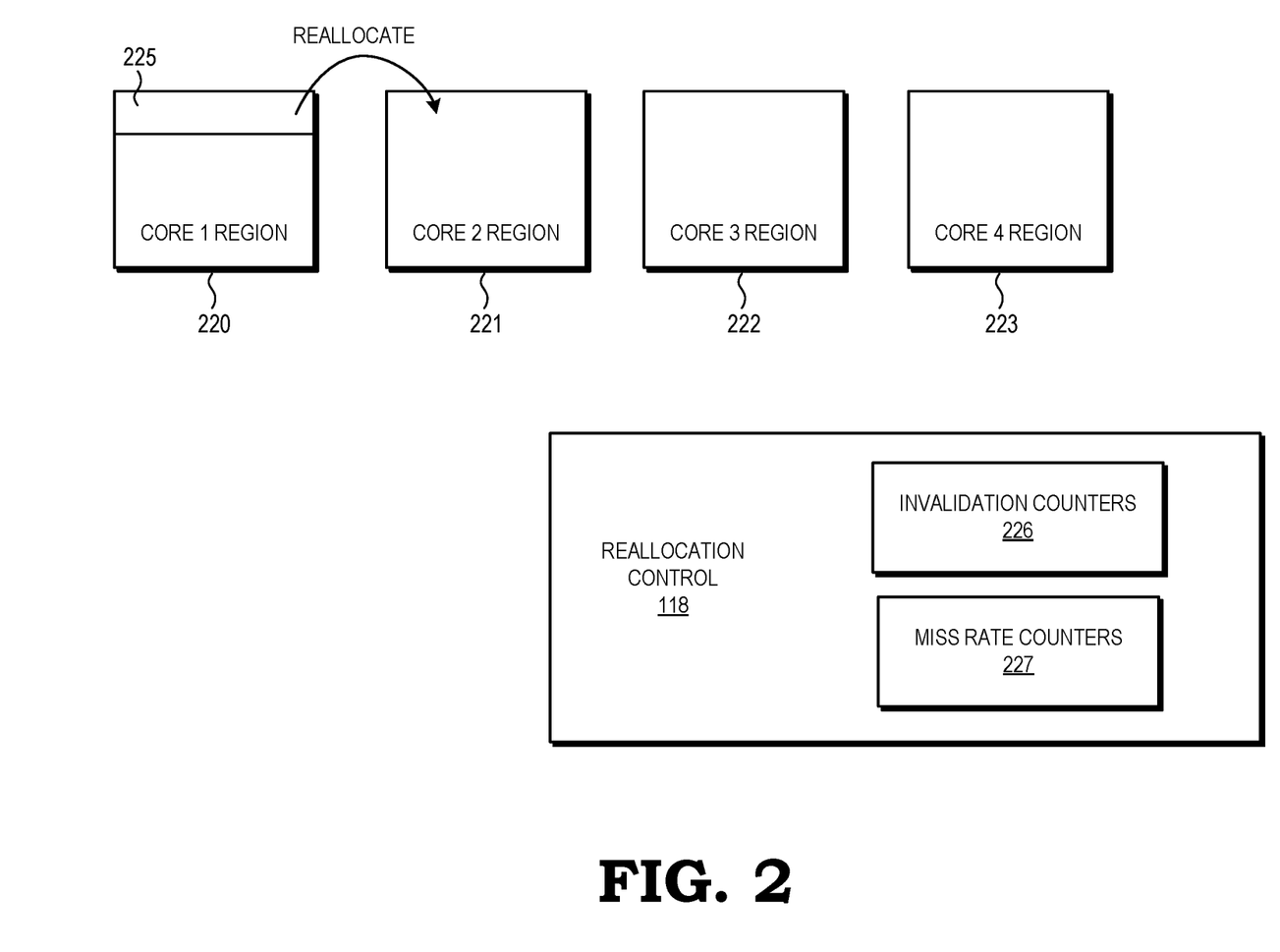
FIG. 2 is a block diagram depicting an example of the processing system of FIG. 1 reallocating an entry of the coherency directory from one region to another in accordance with some embodiments.

FIG. 2 illustrates a block diagram depicting an example of the processor 100 of FIG. 1 reallocating an entry of the coherency directory 119 from one region to another in accordance with some embodiments. In the depicted example, the coherency manager 110 has divided the coherency directory 119 into four regions, designated regions 220, 221, 222, and 223, and has assigned each region to a different one of the processor cores 102-105—in particular, region 220 is assigned to processor core 102, region 221 is assigned to processor core 103, region 222 is assigned to processor core 104, and region 223 is assigned to processor core 105.

The reallocation control module 118 includes different counters to track different indicators of expected recall costs, including invalidation counters 226 and miss rate counters 227. The invalidation counters 226 are a plurality of counters wherein each invalidation counter tracks, for a different one of the regions 220-223, a number of cache lines in the cache hierarchy invalidated in response to evictions of entries at the corresponding region. The miss rate counters are a plurality of counters wherein each miss rate counter tracks, for a different one of the regions 220-223, a number of misses at the coherency directory 119 caused by the processor core to which the region is assigned.

In operation, the reallocation control module 118 adjusts each of the invalidation counters 226 and miss rate counters 227 in response to a corresponding event at the processor 100. For example, in response to invalidation of a cache line at the cache 112 based on eviction of an entry of a region, the reallocation control module 118 increments the corresponding one of the invalidation counters 226. In addition, the reallocation control module 118 periodically resets or decays the invalidation counters 226 and miss rate counters 227 based on a specified reset and decay protocol.

In response to a specified reallocation event, such as after expiration of a specified period of time (e.g., every N clock cycles or every M executed instructions), or such as one of the regions 220-223 having no more available entries, the coherency manager 110 accesses the invalidation counters 226 and the miss rate counters 227 to determine the expected recall costs for reallocating an entry of each of (or a subset of) the regions 220-223. The coherency manager 110 selects the region having the lowest expected recall costs and reallocates an entry of the selected region to another region, such as the region having no more available entries. In the example of FIG. 2, the region 220 is assumed to have the lowest recall costs, and therefore the coherency manager reallocates an entry 225 of region 220 to region 221.

Figure 3:
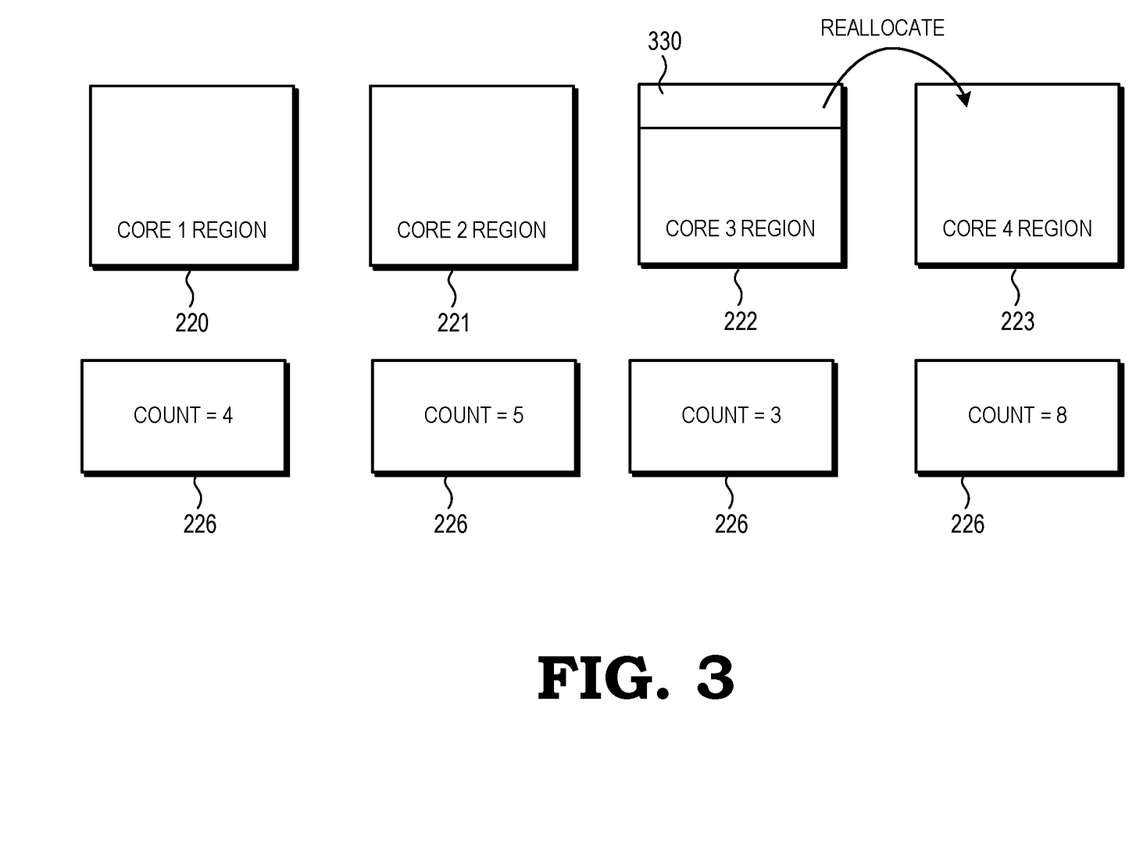
FIG. 3 is a block diagram depicting an example of the processing system of FIG. 1 reallocating an entry of the coherency directory based on a history of cache entry evictions in accordance with some embodiments.

FIG. 3 is a block diagram depicting an example of the processor 100 of FIG. 1 reallocating an entry of the coherency directory 119 based on a history of cache entry invalidations in accordance with some embodiments. FIG. 3 illustrates each of the regions 220-223 of FIG. 2, above, and further depicts a count of cache evictions associated with each region as tracked by the invalidation counters 226. Thus, each of the counts correspond to the number of cache lines invalidated in the cache hierarchy in response to eviction of entries of the corresponding region.

It is assumed that, for the example of FIG. 3, the coherency manager 110 is engaged in a periodic rebalancing of the entries allocated to each of the regions 220-223. Accordingly, the coherency manager 110 retrieves the counts from each of the invalidation counters 226 and determines that region 223 is associated with the most number of invalidations, and thus has the highest recall costs. That is, evictions of entries at the region 223 are likely to result in the greatest resource costs at the processor 100. The coherency manager 110 further determines that the region 222 is associated with the lowest number of invalidations, and therefore has the lowest recall costs. In response, the coherency manager 110 reallocates the entry 330 from the region 222 to the region 223. Thus, the region that is expected to impose the highest recall costs is assigned more entries, reducing the likelihood of entry invalidations at the region and thereby conserving processor resources.

Figure 4:
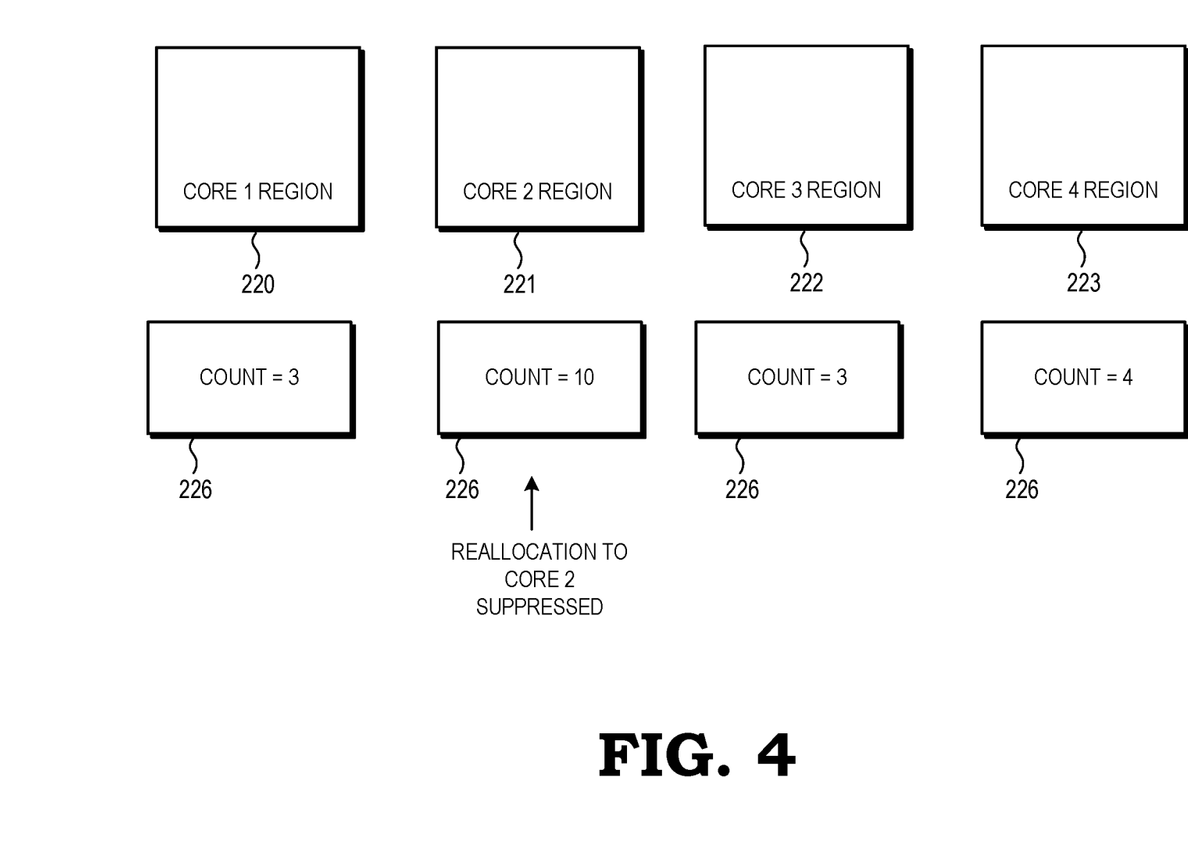
FIG. 4 is a block diagram depicting an example of the processing system of FIG. 1 suppressing reallocations of entries of the coherency directory to a processor core based on a history of cache entry evictions in accordance with some embodiments.

FIG. 4 is a block diagram depicting an example of the processor 100 of FIG. 1 suppressing reallocations to a region of the coherency directory 119 based on a history of cache entry invalidations in accordance with some embodiments. FIG. 4 illustrates each of the regions 220-223 of FIG. 2, above, and further depicts a count of cache evictions tracked by the invalidation counters 226. However, in contrast to the example of FIG. 3, the counts depicted at FIG. 4 correspond to the number of cache lines invalidated in the cache hierarchy in response to an entry of the coherency directory 119 being reassigned from another region to the associated region. Thus, in the depicted example, reallocation of entries to region 220 has caused three cache lines to be invalidated in the cache hierarchy.

It is assumed that, for the example of FIG. 3, the counter for region 221 has exceeded a specified threshold of nine cache line invalidations. In response, the coherency manager 110 suppresses reassignment of entries from the regions 220, 222, and 223 to the region 221. Thus, when reallocations to a region impose recall costs above a threshold, the coherency manager 110 suppresses reallocations to that region, thereby conserving processor resources.

Figure 5:
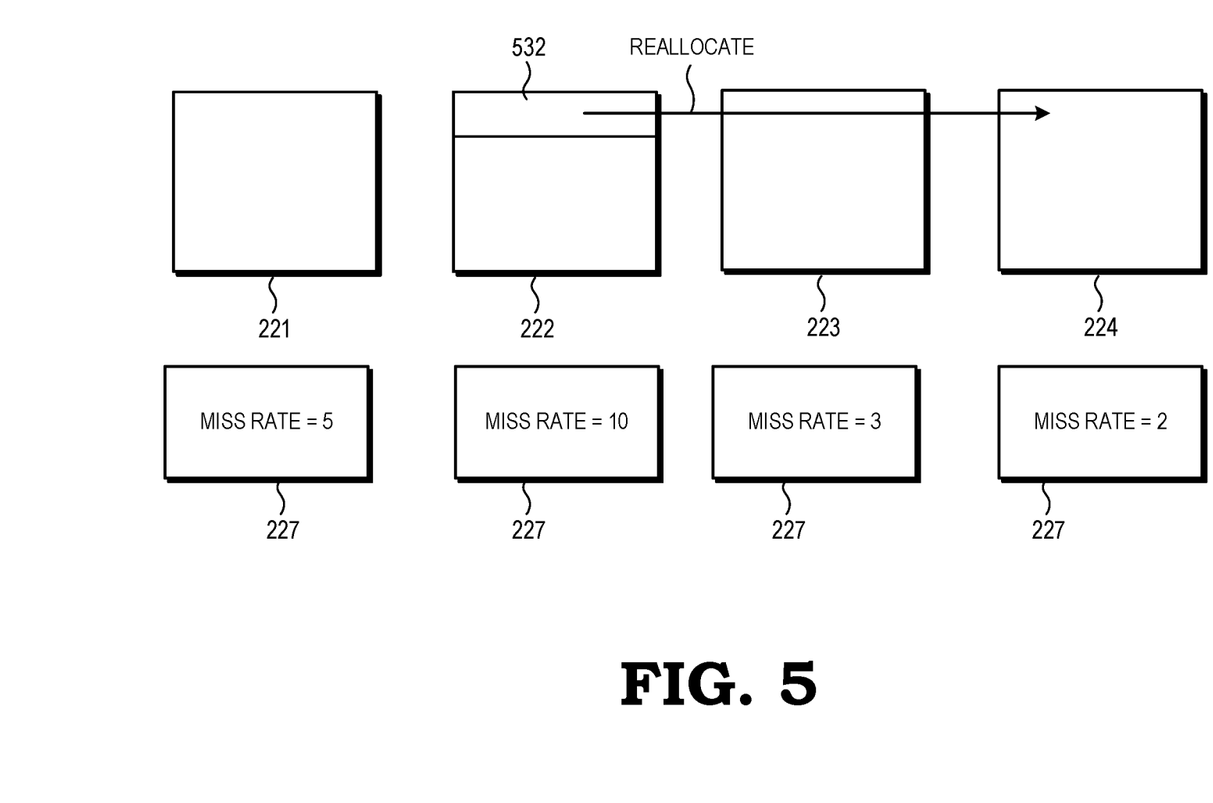
FIG. 5 is a block diagram depicting an example of the processing system of FIG. 1 reallocating an entry of the coherency directory based on hit rates to different regions of the coherency directory in accordance with some embodiments.

FIG. 5 is a block diagram depicting an example of the processor 100 of FIG. 1 reallocating an entry of the coherency directory 119 based on a coherency directory miss rate in accordance with some embodiments. FIG. 5 illustrates each of the regions 220-223 of FIG. 2, above, and further depicts a directory miss rate associated with each region as tracked by the miss rate counters 227. Thus, each of the counts correspond to a miss rate in the coherency directory 119 for the corresponding region.

It is assumed that, for the example of FIG. 5, the coherency manager 110 is engaged in a periodic rebalancing of the entries allocated to each of the regions 220-223. Accordingly, the coherency manager 110 retrieves the miss rates from each of the miss rate counters 227 and determines that region 222 is associated with the highest miss rate, and thus has the highest recall costs. That is, the region 222 is likely to consume a high number of entries of the coherency directory 119 based on the high miss rate. The coherency manager 110 further determines that the region 224 is associated with the lowest miss rate, and therefore has the lowest recall costs. In response, the coherency manager 110 reallocates the entry 532 from the region 224 to the region 222.

Figure 6:
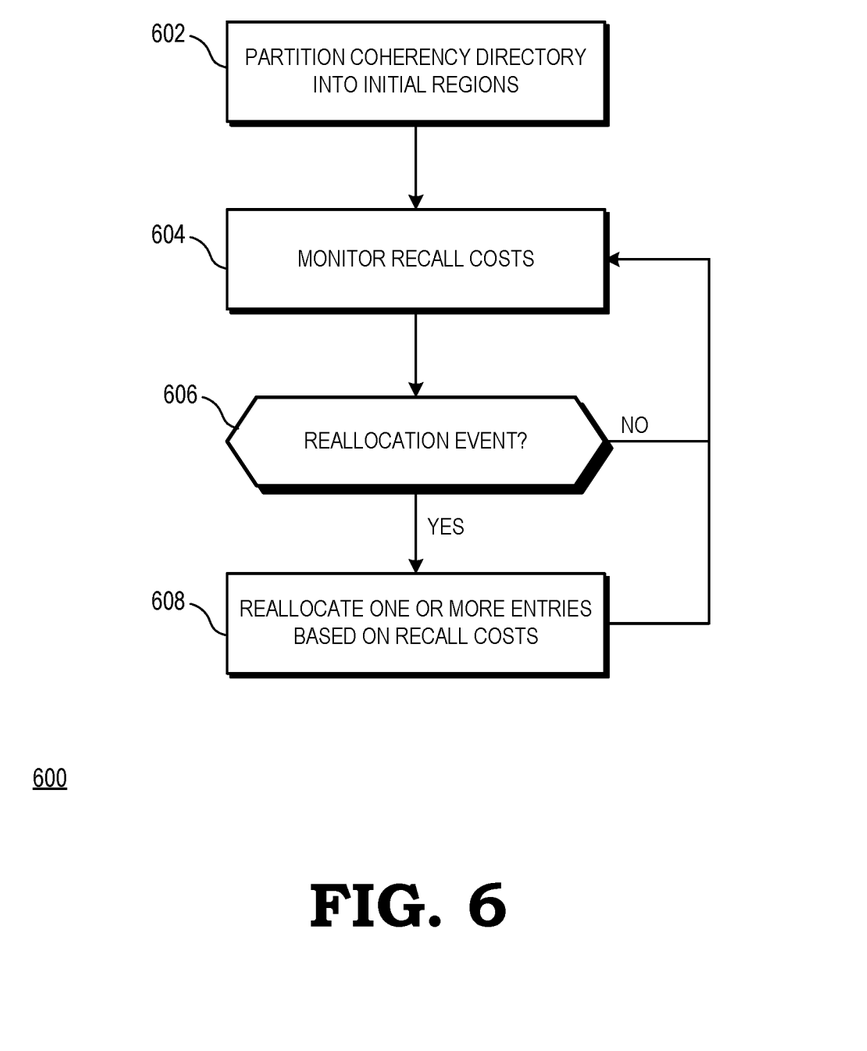
FIG. 6 is a flow diagram of a method of managing allocation of entries of a coherency directory among different processor cores based on recall costs for a corresponding cache in accordance with some embodiments.

FIG. 6 is a flow diagram of a method 600 of managing allocation of entries of a coherency directory among different processor cores based on recall costs for a corresponding cache in accordance with some embodiments. At block 602, a coherency manager partitions a coherency directory into a specified set of initial regions and assigns each region to a different processor core. At block 604, the coherency manager monitors information indicative of recall costs for the cache. In some embodiments the information indicative of recall costs includes one or more of the indicators described above, such as a coherency directory miss rate, cache line invalidations based on eviction of coherency table entries, coherency table entry density, and the like. At block 606, the coherency manager determines if an event has occurred that requires reallocation of entries between the regions of the coherency directory. In some embodiments, the reallocation event is a periodic rebalancing indicator that occurs every N clock cycles, an indication that at least one of the regions of the coherency directory has no more available entries, one of the recall cost indicators exceeding a threshold, and the like. If no reallocation event has occurred, the method flow returns to block 604 and the coherency manager continues to monitor the information indicative of recall costs. In response to a reallocation event, the method flow proceeds to block 608 and the coherency manager reallocates one or more entries of the coherency directory based on the monitored information indicative of recall costs.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    associating each region of a plurality of regions of a coherency directory with a different corresponding processor core of a plurality of processor cores, each of the plurality of regions comprising a corresponding plurality of entries to store coherency information for corresponding memory addresses;
    monitoring a recall cost for each of the plurality of regions, the recall cost for a region indicative of a resource cost of reallocating entries of the coherency directory to different regions; and
    adjusting a number of entries allocated to each of the plurality of regions based on the monitored recall costs.

2. The method of claim 1, wherein:
    monitoring the recall cost for each of the plurality of regions comprises maintaining, for each of the plurality of regions, a count of cache entry invalidations resulting from evicting entries from the corresponding region.

3. The method of claim 2, wherein:
    adjusting the number of entries comprises reallocating an entry from a first region to a second region in response the count of cache entry invalidations associated with the second region exceeding a threshold.

4. The method of claim 3, further comprising:
    selecting the first region for reallocation in response to identifying that the first region has the lowest count of cache entry invalidations.

5. The method of claim 2, wherein:
adjusting the number of entries comprises selecting an entry of a first region of the plurality of regions for eviction in response to the first region having the lowest count of cache entry invalidations.

6. The method of claim 1, wherein:
monitoring the recall cost for each of the plurality of regions comprises maintaining, for each of the plurality of regions, a count of cache entry invalidations resulting from reallocating entries to the corresponding region from other regions.

7. The method of claim 6, wherein:
adjusting the number of entries comprises reallocating an entry from a first region to a second region in response the count of cache entry invalidations associated with the first region exceeding a threshold.

8. The method of claim 1, wherein:
monitoring the recall cost for each of the plurality of regions comprises maintaining, for each of the plurality of regions, a count of a number of clock cycles associated with addressing invalidations resulting from reallocating entries to the corresponding region from other regions.

9. The method of claim 1, further comprising:
monitoring a corresponding region miss rate for each region of the plurality of regions, the miss rate for a region indicative of a number of times the corresponding region has indicated that it does not include an entry targeted by a corresponding cache probe; and
wherein adjusting the number of entries comprises adjusting the number of entries based on the monitored recall costs and the monitored region miss rates.

10. A method, comprising:
associating each region of a plurality of regions of a coherency directory with a different corresponding processor core of a plurality of processor cores, each of the plurality of regions comprising a corresponding plurality of entries to store coherency information for corresponding memory addresses;
monitoring a miss rate for each of the plurality of regions, the miss rate for a region indicative of a number of times the corresponding region has indicated that it does not include an entry targeted by a corresponding cache probe; and
adjusting a number of entries allocated to each of the plurality of regions based on the monitored miss rates.

11. The method of claim 10, wherein:
adjusting the number of entries comprises reallocating an entry from a first region to a second region in response the miss rate associated with the first region exceeding a threshold.

12. The method of claim 10, wherein:
adjusting the number of entries comprises reallocating an entry from a first region to a second region in response the miss rate associated with the second region being below a threshold.

13. The method of claim 10, further comprising
monitoring a density value for each of the plurality of regions, the density value for a region indicative of a number of cache lines of the cache associated with each entry of the corresponding region; and
wherein adjusting the number of entries comprises adjusting the number of entries based the monitored miss rates and the monitored density values.

14. A processor comprising:
a plurality of processor cores;
a cache;
a coherency manager to manage coherency at the cache, the coherency manager comprising:
a coherency directory comprising a plurality of regions associated with different corresponding ones of the plurality of processor cores, each of the plurality of regions comprising a corresponding plurality of entries to store coherency information for corresponding memory addresses; and
a control module configured to:
monitor a recall cost for each of the plurality of regions, the recall cost for a region indicative of a resource cost of reallocating entries of the coherency directory to different regions; and
adjust a number of entries allocated to each of the plurality of regions based on the monitored recall costs.

15. The processor of claim 14, wherein:
the control module is configured to monitor by maintaining, for each of the plurality of regions, a count of cache entry invalidations resulting from reallocating entries from the corresponding region to other regions.

16. The processor of claim 15, wherein:
the control module is configured to adjust the number of entries by reallocating an entry from a first region to a second region in response the count of cache entry invalidations associated with the second region exceeding a threshold.

17. The processor of claim 16, wherein:
the control module is configured to select the first region for reallocation in response to identifying that the first region has a lowest count of cache entry invalidations.

18. The processor of claim 15, wherein:
the control module is configured to adjust the number of entries by selecting an entry of a first region of the plurality of regions for eviction in response to the first region having a lowest count of cache entry invalidations.

19. The processor of claim 14, wherein:
the control module is configured to monitor the recall cost for each of the plurality of regions by maintaining, for each of the plurality of regions, a count of cache entry invalidations resulting from reallocating entries to the corresponding region from other regions.

20. The processor of claim 19, wherein:
the control module is configured to adjust the number of entries by reallocating an entry from a first region to a second region in response the count of cache entry invalidations associated with the first region exceeding a threshold.

21. The processor of claim 14, wherein:
the control module is configured to monitor the recall cost for each of the plurality of regions by maintaining, for each of the plurality of regions, a count of a number of clock cycles associated with addressing invalidations resulting from reallocating entries to the corresponding region from other regions.

22. The processor of claim 14, wherein:
the control module is configured to monitor a corresponding region miss rate for each region of the plurality of regions; and
the control module is configured to adjust a number of entries allocated to each of the plurality of regions by adjusting the number of entries based on the monitored recall costs and the monitored region miss rates.

* * * * *